March 31, 1953 H. G. DUHAMEL ET AL 2,633,496

PARTY LINE TELEPHONE SYSTEM

Filed April 5, 1948 10 Sheets-Sheet 1

INVENTORS
HOWARD G. DUHAMEL
RAYMOND A. REED
BY EDWARD O. CAMPBELL

Percy P. Lantz
ATTORNEY

March 31, 1953 H. G. DUHAMEL ET AL 2,633,496

PARTY LINE TELEPHONE SYSTEM

Filed April 5, 1948 10 Sheets-Sheet 2

INVENTORS
HOWARD G. DUHAMEL
RAYMOND A. REED
EDWARD O. CAMPBELL

BY Percy P. Lantzy

ATTORNEY

March 31, 1953 H. G. DUHAMEL ET AL 2,633,496

PARTY LINE TELEPHONE SYSTEM

Filed April 5, 1948 10 Sheets-Sheet 3

INVENTORS
HOWARD G. DUHAMEL
RAYMOND A. REED
BY EDWARD O. CAMPBELL
Percy P. Lantzy
ATTORNEY March 31, 1953 H. G. DUHAMEL ET AL 2,633,496

PARTY LINE TELEPHONE SYSTEM

Filed April 5, 1948 10 Sheets-Sheet 4

INVENTORS
HOWARD G. DUHAMEL
RAYMOND A. REED
BY EDWARD O. CAMPBELL
Percy P. Lantzy
ATTORNEY March 31, 1953 H. G. DUHAMEL ET AL 2,633,496

PARTY LINE TELEPHONE SYSTEM

Filed April 5, 1948 10 Sheets-Sheet 5

INVENTORS
HOWARD G. DUHAMEL
RAYMOND A. REED
EDWARD O. CAMPBELL
BY Percy P. Lantzy
ATTORNEY

PARTY LINE TELEPHONE SYSTEM

Filed April 5, 1948

INVENTORS
HOWARD G. DUHAMEL
RAYMOND A. REED
BY EDWARD O. CAMPBELL
Percy P. Lantzy
ATTORNEY March 31, 1953 H. G. DUHAMEL ET AL 2,633,496

PARTY LINE TELEPHONE SYSTEM

Filed April 5, 1948 10 Sheets-Sheet 7

INVENTORS
HOWARD G. DUHAMEL
RAYMOND A. REED
BY EDWARD O. CAMPBELL
Percy P. Lantzy
ATTORNEY March 31, 1953 H. G. DUHAMEL ET AL 2,633,496

PARTY LINE TELEPHONE SYSTEM

Filed April 5, 1948 10 Sheets-Sheet 8

INVENTORS
HOWARD G. DUHAMEL
RAYMOND A. REED
BY EDWARD O. CAMPBELL
Percy P. Lantzy
ATTORNEY March 31, 1953 H. G. DUHAMEL ET AL 2,633,496

PARTY LINE TELEPHONE SYSTEM

Filed April 5, 1948 10 Sheets-Sheet 9

INVENTORS
HOWARD G. DUHAMEL
RAYMOND A. REED
BY EDWARD O. CAMPBELL
Percy P. Lantzy
ATTORNEY March 31, 1953 H. G. DUHAMEL ET AL 2,633,496

PARTY LINE TELEPHONE SYSTEM

Filed April 5, 1948 10 Sheets-Sheet 10

INVENTORS
HOWARD G. DUHAMEL
RAYMOND A. REED
BY EDWARD O. CAMPBELL
Percy P. Lantzy
ATTORNEY Patented Mar. 31, 1953

2,633,496

UNITED STATES PATENT OFFICE 2,633,496

PARTY-LINE TELEPHONE SYSTEM

Howard G. Duhamel, Verona, N. J., Edward O. Campbell, Flushing, N. Y., and Raymond A. Reed, Rutherford, N. J., assignors to Federal Telephone and Radio Corporation, New York, N. Y., a corporation of Delaware Application April 5, 1948, Serial No. 19,027

13 Claims. (Cl. 179—17)

This invention relates to new and useful means in a community for establishing connections between subscribers in automatic switching systems and is more particularly related to the two-way trunk circuits and the trunk links by means of which such calls are established.

In small community automatic systems of the type to which this invention relates, the call number consists of four digits, the first three of which designate the line number which identifies the location of the line in the final selector terminal banks. The fourth digit designates the type of ringing current to be sent over the call line to ring one of the parties on a multi-party line.

According to one feature of the invention, the trunk circuit is arranged to repeat the dial pulses received from the central office operator to the register link and to the register. A rotary switch, called the trunk marker switch, in the trunk circuit is stepped coincidently by the impulses of the first digit to determine if the number dialed represents an assigned hundreds digit or not.

According to another feature of the invention the trunk marker switch, after being stepped by the impulses of the first digit, is stepped to a definite predetermined position and advances only one step for each of the tens and units digits.

Still another feature of the invention provides for the stepping of the trunk marker switch in accordance with the pulses of the fourth or ringing digit thus advancing the wipers of the switch from the previous position, in which it was set as the result of the dialing of the first three digits. During this setting of the marker switch the pulses are not transmitted beyond the trunk circuit.

According to another feature of the invention, the ringing current sent to the called line is determined by the position of the trunk marker switch from the trunk circuit and if the called line is busy, the trunk circuit receives a line busy signal and thereupon sends a flashing busy signal to the operator.

According to still another feature of the invention, the trunk may be seized by the selector of a trunk link when a subscriber makes a call to the operator and automatically signals the operator of the presence of such a call.

The trunk link provides the transmission circuit which supplies talking battery to the local subscriber and sends reverse battery supervision to the operator and the trunk link is arranged to connect the line conductors of the local subscriber directly to the transmission circuit of the trunk.

The above mentioned and other features and objects of this invention and the manner of obtaining them will become more apparent and the invention will be best understood by reference to the following description of an embodiment of the invention taken in conjunction with the accompanying drawings which show the two-way trunk link circuits in detail and the related switching apparatus in block diagram form, wherein.

*General description*

Figure 1:
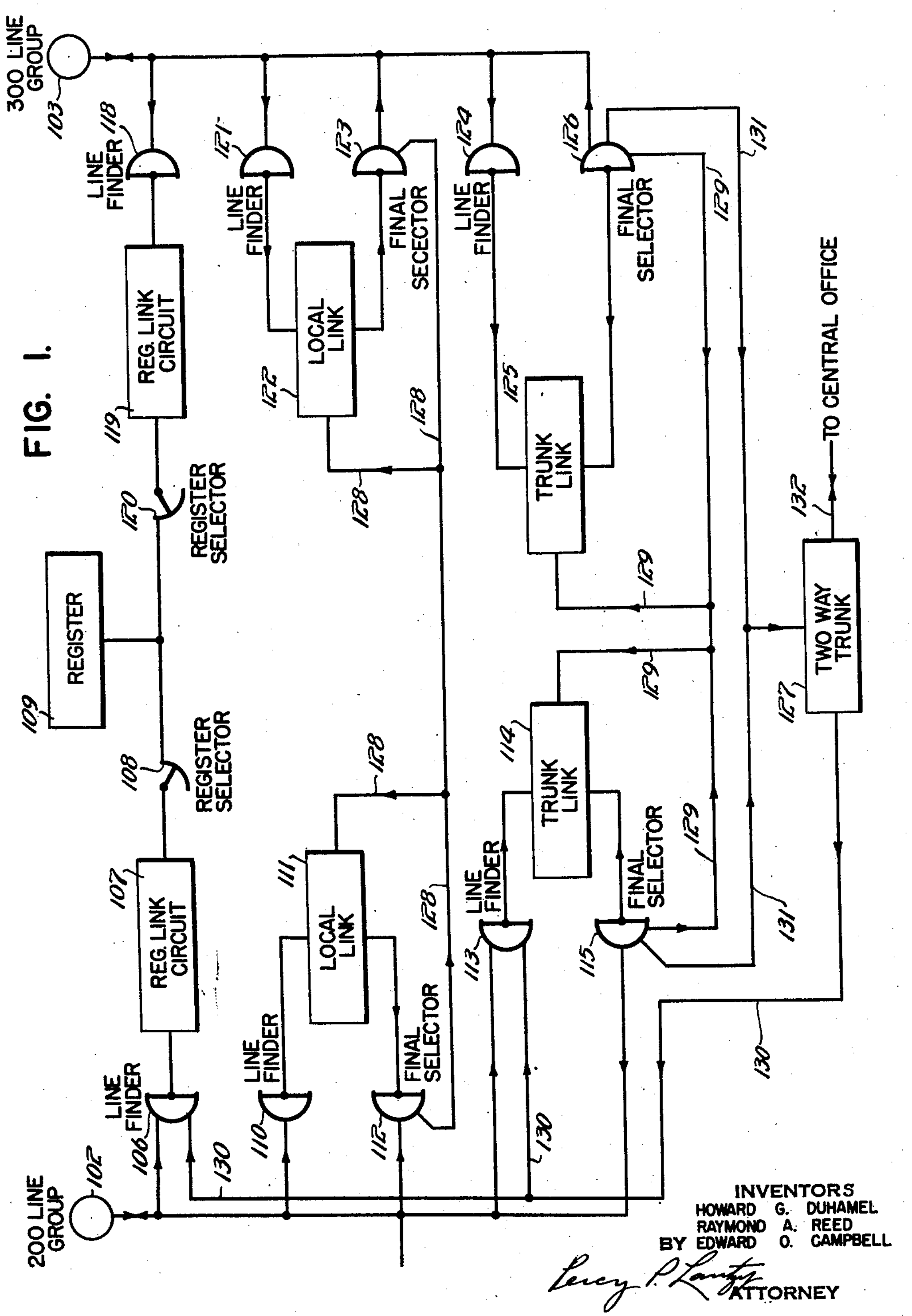
Fig. 1 shows in diagrammatic form the switches and various circuits of the complete system.

Fig. 1 illustrates diagrammatically a system serving 200 lines. The well known 100-point power driven switch having seven brushes is employed as a register link line finder 106, a line finder 110 and a final selector 112. A register link circuit 107 employs, in addition to the line finder 106, a rotary step-by-step switch 108 to select an idle register 109. Each local link circuit 111 has a line finder 110 and the final selector 112. All seven brushes are used on the line finder but only four of the brushes in the final selector are used for calls within the 100 line group served by the associated local link. On calls to other hundred line groups the other three brushes and one of the first four mentioned of the final selector are employed. Access to the local link 111 may be had from the other local links 122 over a three-wire circuit 128.

Trunk lines 114 and 125 are employed which are similar to the local links 111 and 122 except that they contain metallic transmission circuits without battery supply, whereas the local links 111 and 122 supply battery through a condenser feed bridge.

Two-way interoffice trunk circuits 127 are employed which terminate in a six conductor circuit, three of which are used for the line circuit at final selectors of the trunk link circuits 114 and 125 while the other three serve for hunting purposes at the terminals of the line finders 106, 113, 113 and 124.

The arrows in Fig. 1 indicate the direction of the calls. For installations up to 100 lines only the line finders 106, 110 and 113, the final selectors 112 and 115, links 107, 111 and 114, register selectors 108, registers 109 and two-way trunks 127 need be provided in sufficient quantities to satisfy traffic requirements. An installation for 200 lines does not require duplication of all equipment but the lines of group 103 need their own line finders 118, 121 and 124 and final selectors 123 and 126, with appropriate local and trunk links 122 and 125 and register links 119, which may be connected with registers 109 via register selectors 120. It will be understood, of course, that while 200 lines are referred to in this embodiment by way of example only, many more 100 line groups are contemplated.

The two-way trunk circuits like 127 are accessible to all the groups over the multiple 131. These trunk circuits 127 terminate in conductors 130 on the banks of the line finders 106 and 113. They require line numbers but no line circuits. The line numbers of the trunk circuits need not be consecutive.

When the subscriber 102 belonging to the 200 line group calls, the line relay energizes the start circuit, not shown, which starts the line finders 106 of all the idle register links 107 serving the 200 group of lines and places potential on the test terminals of the register link line finders 106. The line finders 106 of the register links 107 hunt together and when one finds the calling line, the line cutoff relay is energized and the energizing condition is withdrawn from the start circuit which removes the test potential from the test terminals. As soon as the line finder 106 of a register link finds the line, an idle register 109 is selected by the register selector 108 and when the register is attached to the link 107, dial tone is transmitted from the link to the calling line 102.

The subscriber now dials the call number and dial pulses are repeated by a relay in the register link 107 not only to the register circuit 109 but to a rotary switch, called the link marker switch, in the link 107. Impulses of the first digit position the link marker switch. The first digit dialed is the hundreds digit of the local line number or the single code digit for a trunk.

If the hundreds digit designates the same group of 100 lines, in which the calling line is located, three relays are operated that adjust the link 107 to signal the register 109 that final selection is not to be made in accordance with the hundreds digit and the final selector 112 of the local link 111 is selectively operated to connect called with the calling line.

If the hundreds digit designates some other group, e. g. 300 line group, two of the three relays are operated and the register is signaled to selectively operate the final selector 112 as a group selector to select the group of trunks in accordance with the hundreds digit and to hunt for an idle trunk 128 leading to a final selector in the desired 100 line group. The selected final selector in this example would be one like 123 and it is then operated to select line 103 in the 300 line group.

If the hundreds digit designates an unequipped group, the register link 107 releases and the line is locked out.

If the code is dialed, another relay is operated which adjusts the register link 107 to start line finder 113 of a trunk link 114 and to use the final selector 115 to hunt for an idle two-way trunk circuit 127.

All of the selectors are controlled by the register on a local call. The tens and units digits are not registered in the register link 107 but the above mentioned link marker switch in the link is arranged to move to position 9 after the first digit is dialed and the above operations take place provided that digit signifies a local line. Provision is made for release when the digit designates an unequipped 100 line group. Thus positions 10 and 11 of the link marker switch absorb the tens and units digits.

After the first digit has been dialed, the line finders 110 of the idle local links 111 or 113 of a trunk link 114, designated by the dialing of the first digit as above described, are started and one of them seizes the calling line.

A fourth digit is dialed by the calling subscriber to select the called station in a ten party ringing system. This moves the link marker switch in the register link 107 to a position for connecting the proper ringing current to the link for ringing the bell of the desired party.

When the called subscriber answers, the register link 107 is disconnected and the local link supplies battery for conversation. If the called subscriber's line is busy, busy tone is supplied from the register link 107. The called line is tested by the register 109 which signals the register link that the called line is busy or idle.

On an inward call the two-way trunk 127 obtains the register link 107 and the dial pulses are recorded as above described. On such calls a trunk link 114 is used on account of the transmission battery supply but the operation is substantially the same as above.

*Detailed description*

The attached drawings show the circuit for establishing the connections described above in general terms with reference only to central office calls which involve the trunk link and two-way trunks that form the subject matter of this application. The connections to the ringing generator and the various tone and interrupters are marked to indicate the purpose of such conductors.

Figures 2, 3, 4:
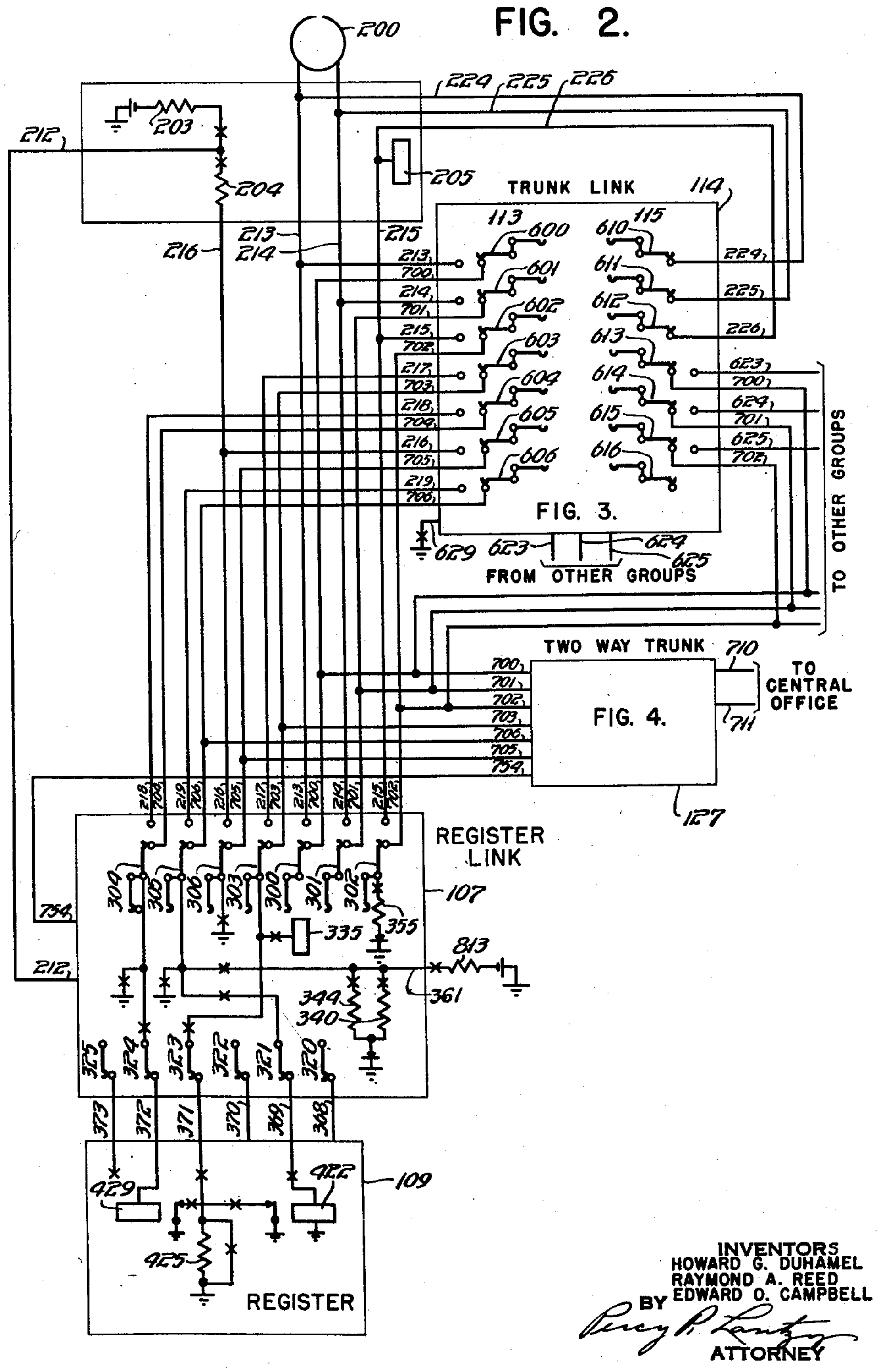
Fig. 2 shows in block diagrams the elements of the circuits other than the trunk and trunk link circuits to clarify the operation and facilitate the description herein.
Fig. 3 shows the trunk link circuit when
Fig. 4 shows the two-way trunk circuit when
Figure 3A:
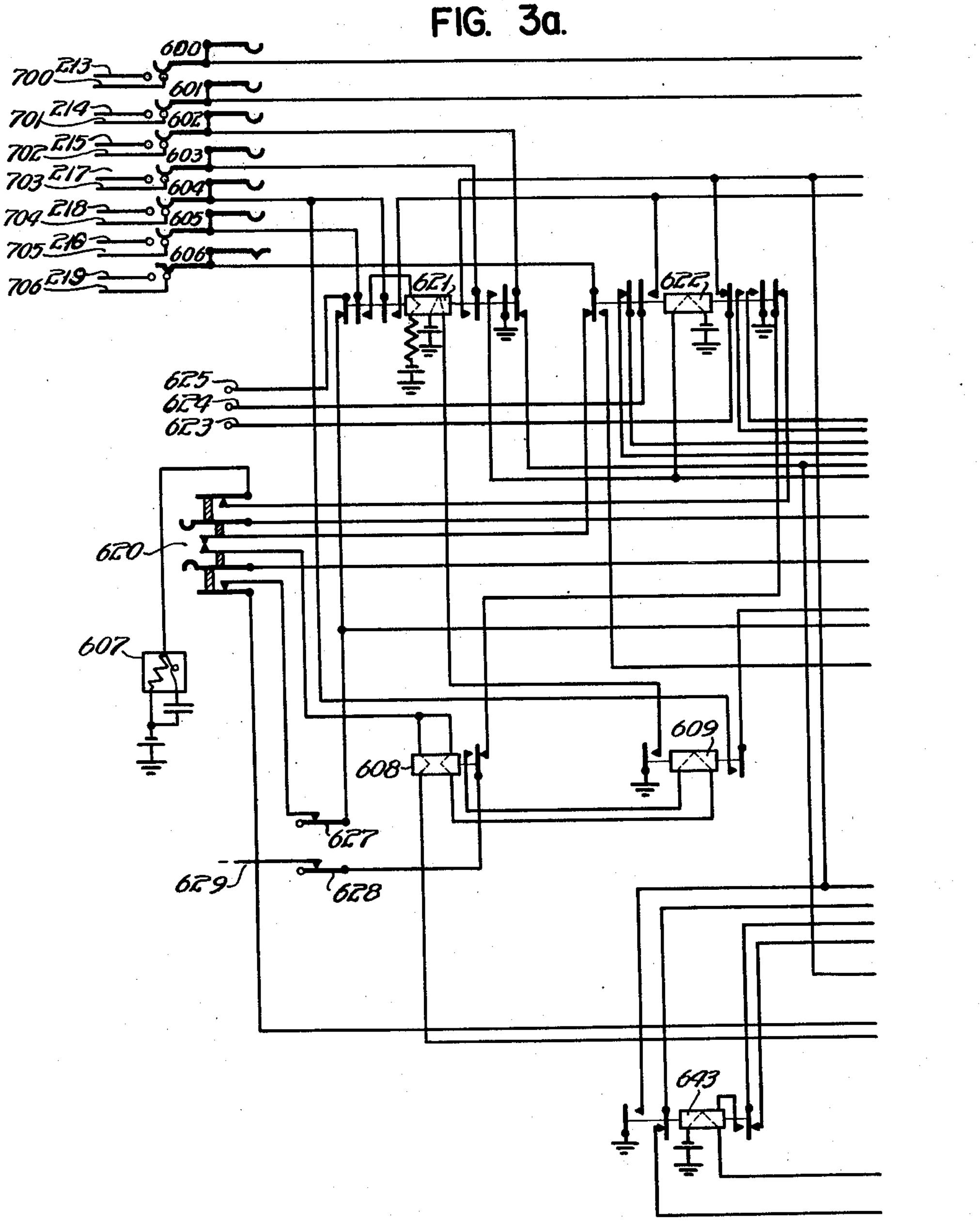
Figs. 3*a*, 3*b* and 3*c* are placed together in accordance with Fig. 5.
Figure 3B:
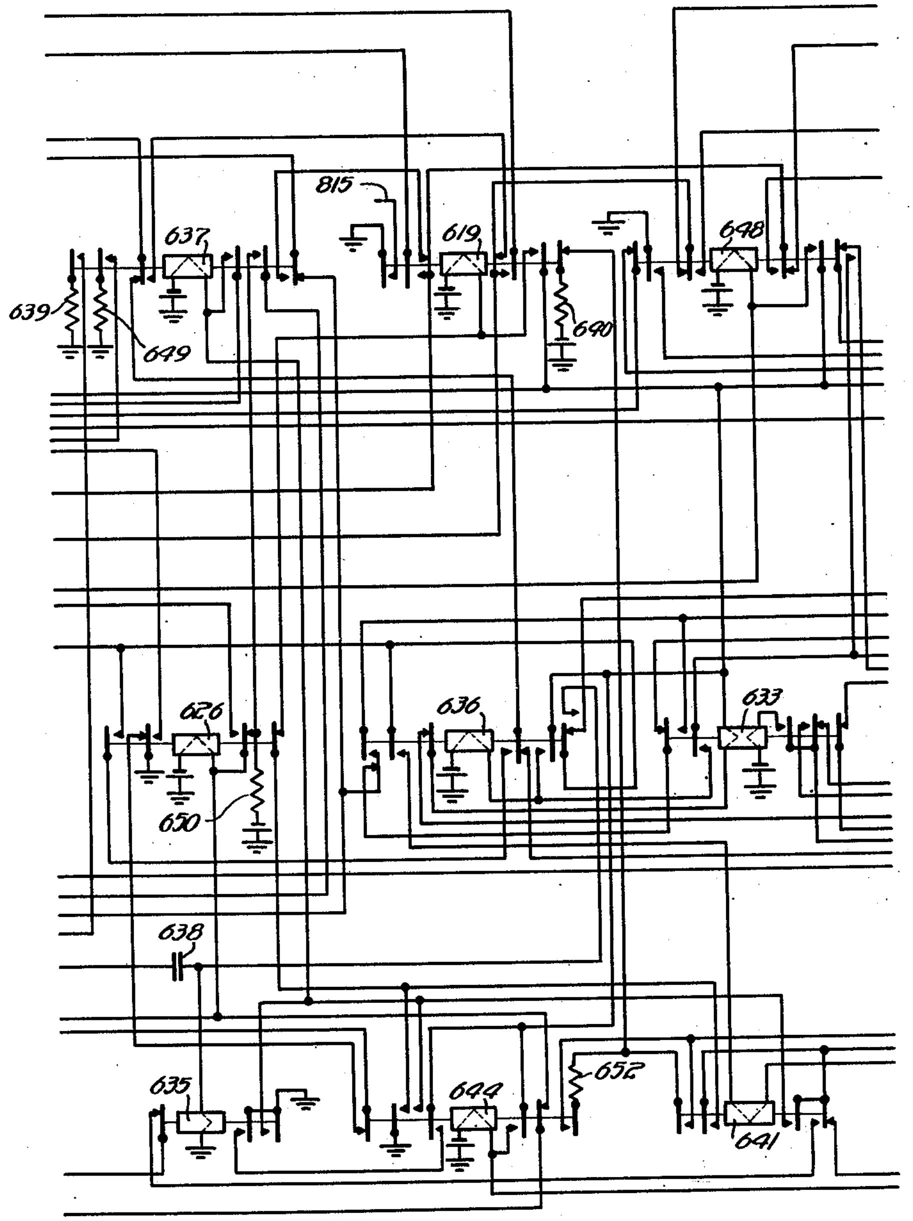
Figure 3C:
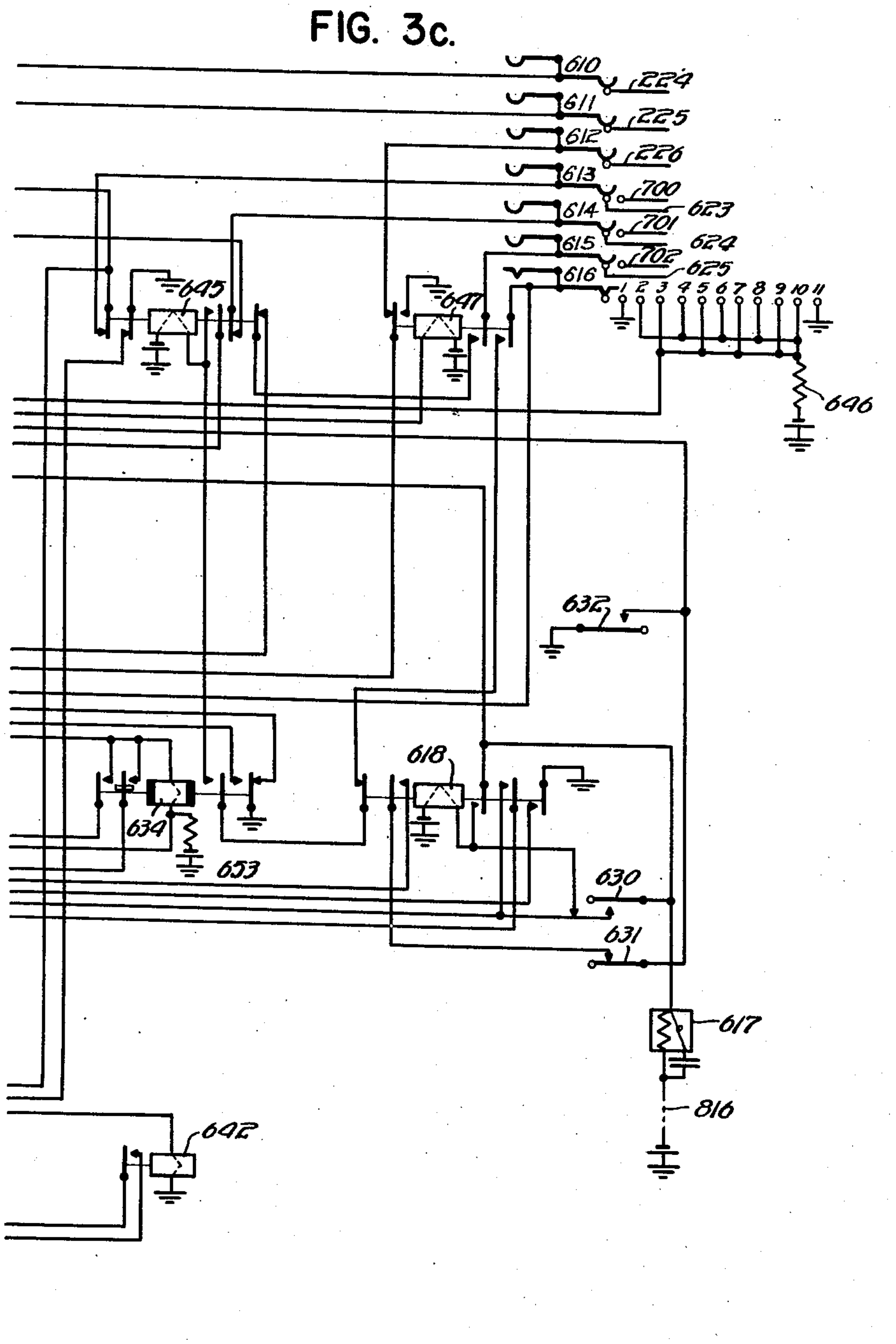
Figure 4A:
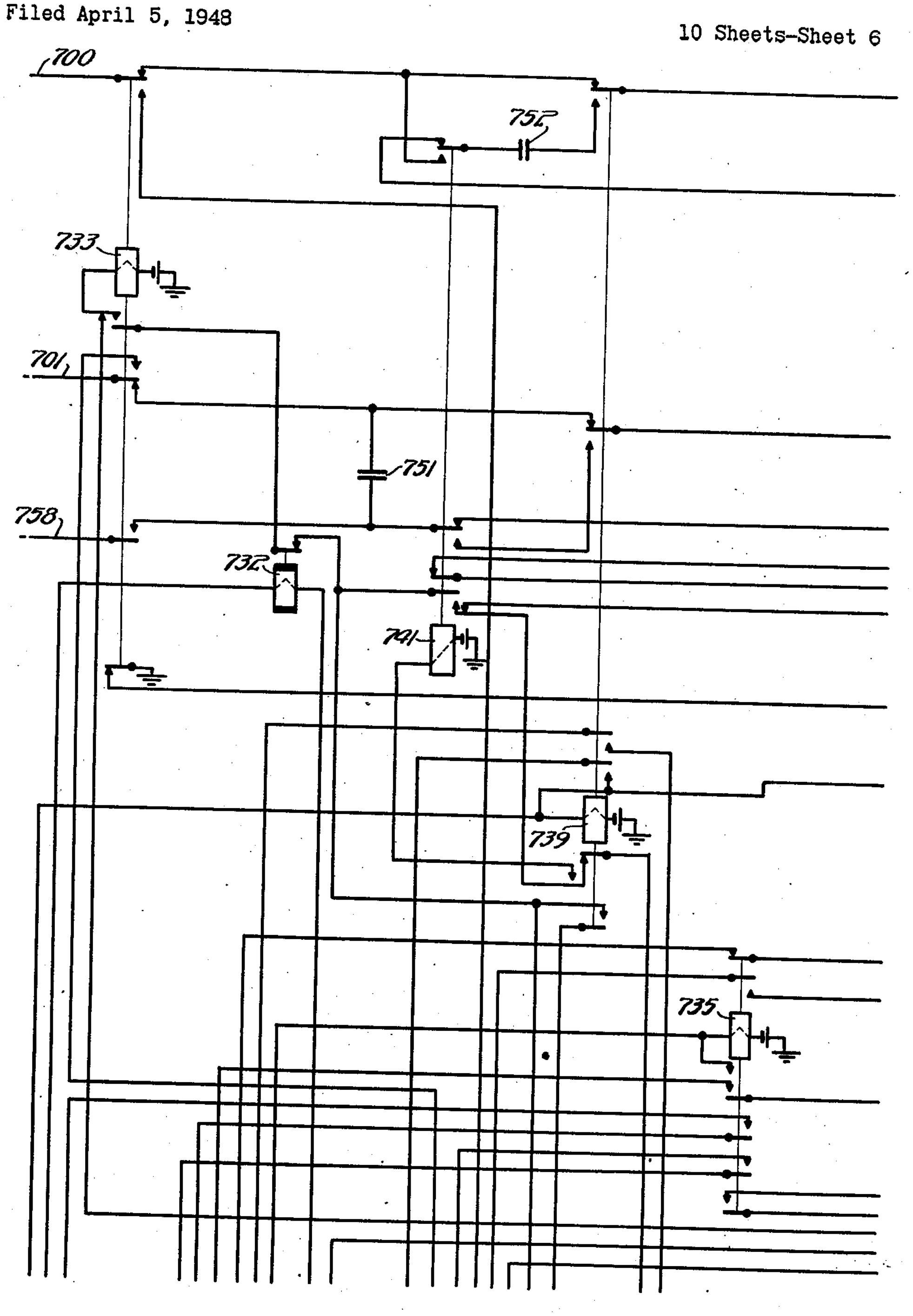
Figs. 4*a*, 4*b*, 4*c* and 4*d* are placed together as shown in Fig. 5.
Figure 4B:
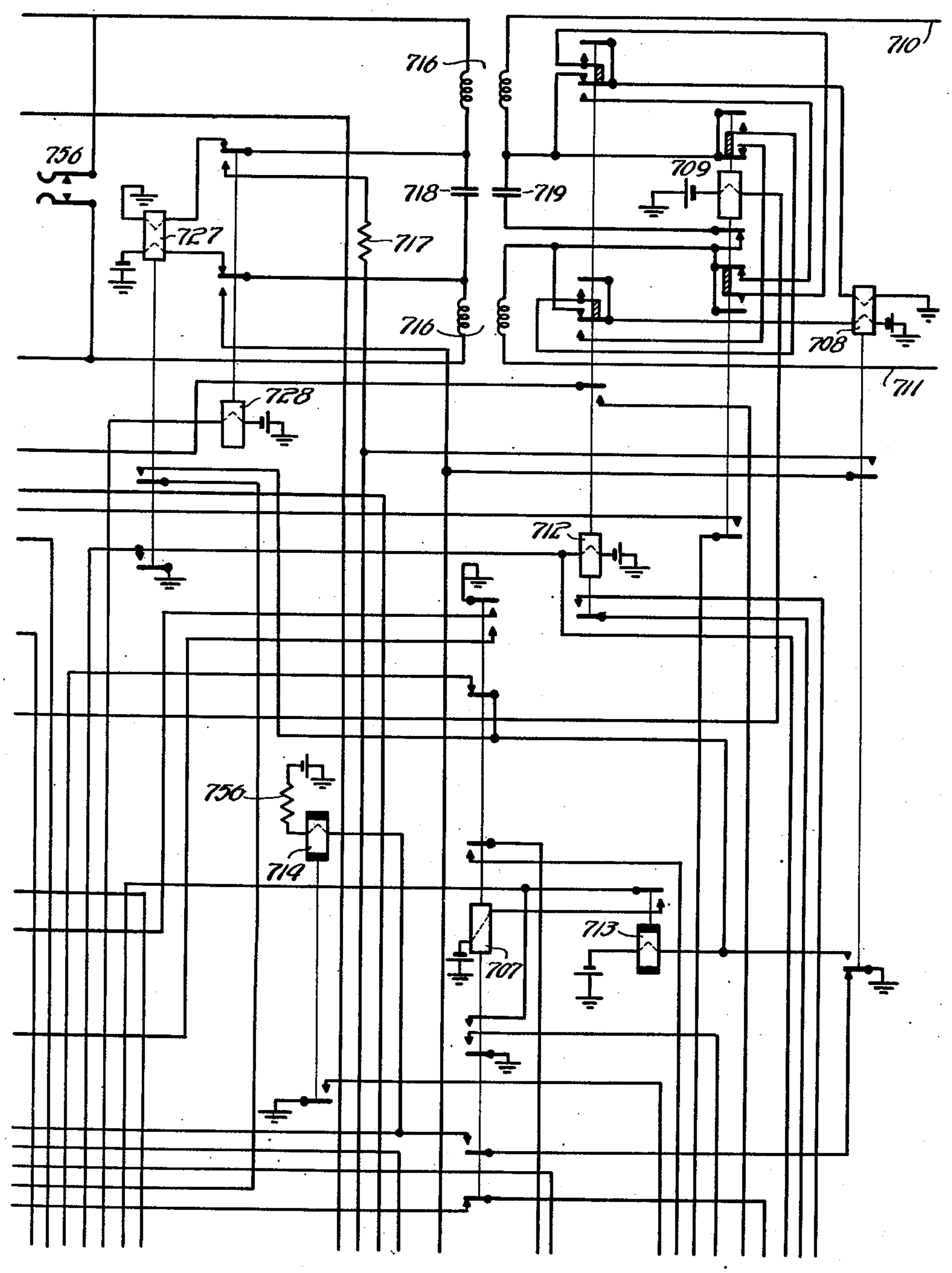
Figure 4C:
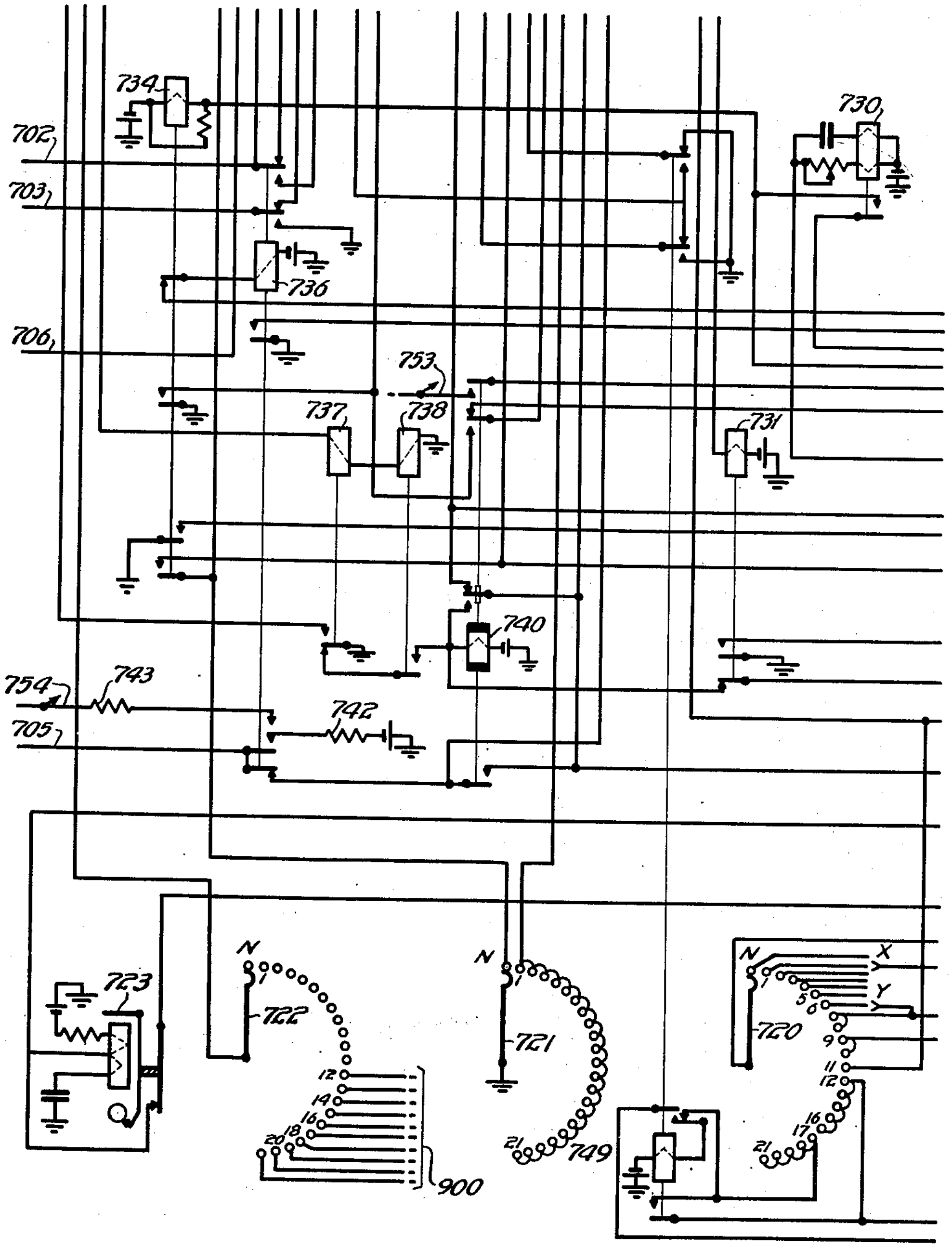
Figure 4D:
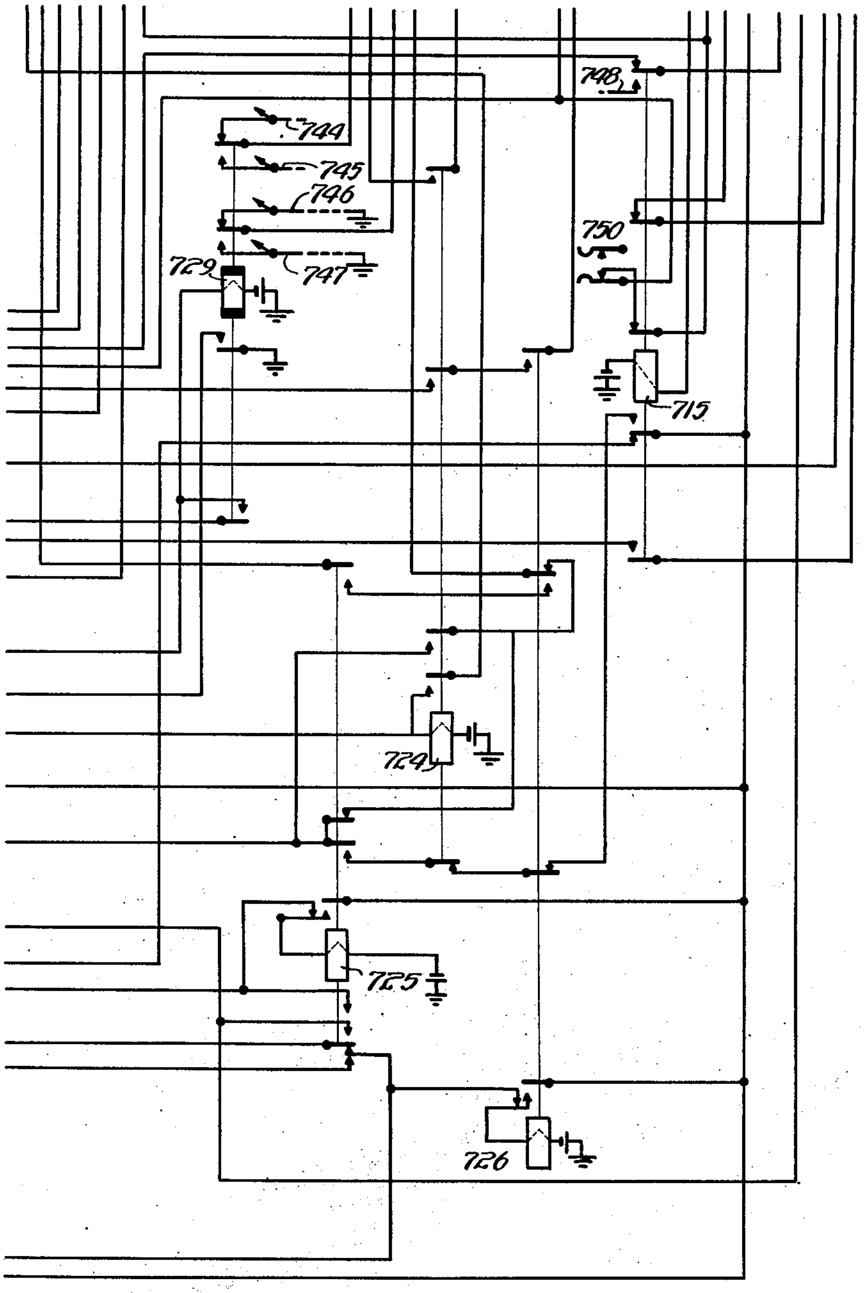
Figure 5:
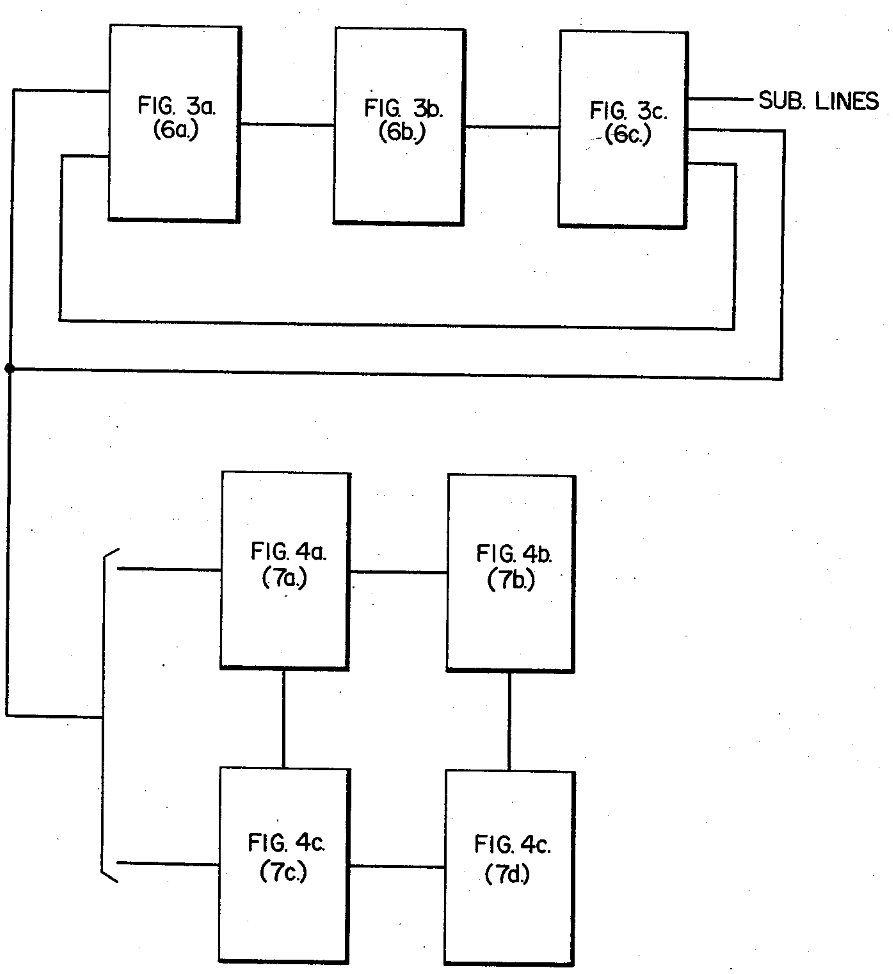
Fig. 5 shows the relation of the portions of the various figures and how they should be put together to form the circuits.

In Fig. 2 is shown a subscriber's line circuit 200, a trunk link 114, a register link 107 and a register circuit 109 in block form with the connecting conductors and in sufficient detail to show how these circuits operate in conjunction with the trunk link of Fig. 3 and the two-way trunk circuit of Fig. 4.

The drawings show the contacts of a given relay related by a fine line to the relay winding which controls them. The description is divided into sections as follows:

A—Local subscriber calls the operator—
1. Attaching a trunk link
2. Trunk selection
3. Operation of two-way trunk circuit
4. Release B—Incoming call from a manual operator—
1. Register link attached
2. Reception of the first, second and third digits
3. Attaching a trunk link
4. Selection of a called line in same hundreds group
5. Test of called line
6. Called line tests free
7. Called line tests busy
8. Reception of fourth digit and ringing
9. Selection of a called line in a different hundreds group
10. Talking, supervision and release

A—LOCAL SUBSCRIBER CALLS THE OPERATOR

The subscriber at station 200 lifts his receiver and dials "0" to make a call to the operator. This causes the line finder 106 of the register link 107 to attach the register link to the calling line and register selector 108 selects an idle register 109. A relay is operated in the register link as the result of the ten dial pulses received, which adjusts the register link and the register to start the line finders 113 of the idle trunk links 114.

1.—*Attaching a trunk link*

The operation of a relay in the register link circuit energizes the start circuit which connects test potential from battery, resistance 813, conductor 361, brush 305 of the link line finder to conductor 219 as shown in Fig. 2. The start circuit also connects ground to conductor 629 for operating the line finder clutch magnet of all free trunk links.

Referring to Fig. 3, the brushes of the line finders rotate until brush 606 of one of them encounters test potential on conductor 219 to operate relay 608. Relay 608 releases clutch magnet 607 to stop the line finder and connects ground through a low resistance path consisting of the winding of relay 609 in series with the second winding of relay 608 to brush 606. Relay 609 is operated and this low resistance path shunts down the test potential making the circuit busy. If a double test should occur, i. e. two line finders test the same line at the same time, there is insufficient current to hold both relays 608 or to operate relay 609. The first relay 608 to release removes its low resistance shunt allowing the other relay 608 to hold. The former circuit remains normal and waits for the next call. Relay 609 operates relay 621 and closes a circuit from finder brush 604 to relay 648 to permit the reception of the group selection signal.

Relay 621 locks to ground in the register link circuit via link line finder brush 306, conductor 216, and trunk line finder brush 605. The operation of relay 621 opens the circuit from incoming conductor 625 to relay 626 to prevent selection of the link by a group selector and operates relay 622. The register link circuit releases the start circuit which opens ground from conductor 629 to stop all free line finders and removes test potential from conductor 361. Relay 622 opens the circuit of relays 608 and 609, and prepares the circuit from finder brush 606 to selector brush 615, opens the circuit for clutch magnet 607 to prevent the line finder from moving on the release of the test relays, opens the restoring circuit to clutch magnet 617 of the selector and provides a general operating and locking ground for the trunk link circuit.

2.—*Trunk selection*

The trunks to the operator are connected in multiple to the trunk link selectors of all hundreds groups as shown in Fig. 1. Before the test relay 609 can release a momentary ground is connected to brush 304 of the link line finder, conductor 218, brush 604 of the trunk link line finder, a front contact of relay 609 to operate relay 648. Relay 648 locks to ground at a contact of relay 622 and transfers the link conductors from selector brushes 610 and 611 to brushes 613 and 614, respectively, via contacts of relay 645 to utilize the terminals in the lower half of the selector arc and operates relay 647 which connects selector brush 615 to finder brush 606 and opens the circuit to selector brush 612.

Ground from a relay of the register, is connected via conductor 371, wiper 323 of the register selector, the register link circuit, brush 303 of the link line finder, conductor 217, brush 603 of the trunk line finder, front contact of relay 621, back contacts of relays 637 and 636, and off-normal contact 630, to operate relay 618. The ground is extended through the winding of selector clutch magnet 617 to battery to operate the clutch magnet. The selector brushes rotate and revertive pulses from selector brush 616 operate relay 429 of the register via back contacts of relays 633, 636 and 637, front contact of relay 621, trunk line finder brush 604, conductor 218, link line finder brush 304, the register link circuit, wiper 324 of the register selector, conductor 372, to relay 429.

When the register has received the allotted number of pulses the selector proceeds to hunt for an idle trunk under the control of the register. A relay 422 is connected through conductor 369, selector wiper 321 of the register link circuit, register brush 305, conductor 219, brush 606 of the trunk line finder, front contact of relay 622, back contacts of relays 636 and 645, a front contact of relay 647 to brush 615. A free trunk is indicated by no ground on the terminal of conductor 702. Relay 422 also controls the ground connection via brush 603 of the trunk link line finder to operate relays 618 and clutch magnet 617. Selector brushes rotate in this circuit until relay 422 operates. A slow relay in the register measures the time during which the trunk test may take place. If no idle trunk is found when this relay operates selector brushes rotate to the first trunk of the next group where ground via selector brush 616 of the previously described circuit operates relay 429 to stop the rotation of the switch. If all trunks are busy the register is released and busy tone is sent to the calling subscriber and the trunk link is released.

If the selected trunk is free, the register connects ground through a resistance 425 via conductor 371, wiper 323 of the register selector, the register link, link line finder brush 303, conductor 217 and trunk line finder brush 603 to operate relay 618 but not clutch magnet 617. Relay 618 short circuits relay 634 and holds relay 633. Relay 634 releases and operates relay 636 via a contact of reay 633.Relay 636 locks to a contact of relay 622 and connects relay 635 via selector brush 615, conductor 702, back contacts of relays 736, 735 and 715, jack 750, to relay 734 of the two-way trunk.

The free trunk signal from the register connects battery via resistance 344, brush 305 of the link line finder, conductor 219, brush 606 of the trunk line finder, front contacts of relays 622 and 636, windings of relays 641 and 642 in series, to operate relay 642 but not relay 641. Relay 642 operates relay 644 which locks to holding ground from relay 622. Relays 343 and 349 release the register links since the second holding path for relays 308 and 326 is opened by relay 333. Relay 635 operates relay 637 which connects ground resistance 649 to hold cutoff relay 205 of the calling line via back contact of relay 621, trunk finder brush 602 and conductor 215. Relay 644 locks to ground from relay 635, operates relay 619, opens the ground path to relay 608 to prevent further testing by the trunk finder and connects battery via resistances 640 and 642 to selector brush 613 and conductor 700 until relay 619 operates.

The release of the register link releases relays 621 and 622. Relay 621 completes the holding path to cutoff relay 202 from relay 637 and opens the paths to trunk finder brushes 603 and 604. The calling subscriber is now connected to the trunk and relay 635 connects ground for holding relays 636, 633, 648, 619 and 644.

3.—*Operation of two-way trunk circuit*

Relay 734 of the two-way trunk circuit operates from ground via relay 635 of the trunk link, selector brush 615, conductor 702, contacts of relays 736, 735 and 715 and jack 750 and opens the path for relay 736 and prepares the circuits for relays 713, 707 and 730. The momentary battery signal from the trunk link via conductor 700 operates relay 727 in advance of the connection of the subscriber's line conductors 213 and 214 through the trunk link by the operation of relay 619 to conductors 700 and 701 and relay 727 is then held by the calling subscriber. Relay 727 operates relays 712 and 713. Relay 712 reverses the battery and ground connections to trunk conductors 710 and 711 to operate a signal, not shown, before an operator in the distant exchange.

Relay 707 is operated from battery, winding of relay 707, front contacts of relays 713 and 734 to ground on wiper 721 in normal position of the trunk marker switch. Relay 714 operates from contacts of relays 707 and 708 and, in turn, operates relay 715. Relay 715 connects ringing tone from conductor 748 via front contacts of relays 715 and 712, back contact of relay 741, condenser 251, and back contact of relay 733 to conductor 701. Relay 730 operates from ground via front contacts of relays 734, 715 and 712 and prepares a circuit for the pay station line signal.

The equipment in the distant exchange is not shown but it is assumed that the line and supervisory signals are operated by reversing the current in the trunk conductors and that a calling dial may be connected to the trunk conductors for controlling the sending of dial pulses.

When the operator answers by connecting to the line, relay 708 operates and transfers the operating ground for relay 714 to the holding ground for relay 713. Relay 714 releases and, in turn, releases relay 715 which disconnects the ringing tone, opens the circuit of relay 730 and completes a path for the pay station tone from conductor 702 to repeating coil 716 via back contacts of relays 736, 735 and 715, jack 750, a contact of relay 730, back contact of relay 715, front contact of relay 712, back contact of relay 741, condenser 751 and back contact of relay 739. Relay 730 is slow releasing to provide time for the signal to be sent. If the operator should miss the signal, it can be repeated by disconnecting momentarily, thus reoperating relay 730 which will reconnect the signal.

The connection is now complete over the repeating coil bridge 716, and condensers 718 and 719.

4.—*Release*

When the subscriber disconnects, relay 727 releases which releases relay 712 to reverse the polarity of conductors 710 and 711 to indicate to the operator to take down the connection. The operator then disconnects and releases relay 708 which, in turn, releases relays 713 and 707. Relays 714 and 715 operate momentarily when relay 708 releases to open the holding path for relay 743 via conductor 702, selector brush 615 and relay 635 of the trunk link so that, when relay 707 releases, relay 635 can release. Relay 635 releases relays 637, 619, 636, 648 and 644. Relay 648 releases relay 647 and completes the restoring path for the selector clutch magnet 617 which returns the selector to normal over its own offnormal contact 632 via contacts of relays 647 and 622. The trunk link and the two-way trunk circuits are now free for new calls.

B—INCOMING CALL FROM A MANUAL OPERATOR

1.—*Register link attached*

It will be assumed that the two-way trunks form a part of line group 200 and are connected via conductors 700, 701, 702, 703, 705 and 706 to the multiple terminals of the line finders of the register and trunk links. When the operator makes a call, a bridge, not shown, on trunk conductors 710 and 711 operates relay 708. Ground from a contact of relay 708 operates relays 713 in an obvious circuit and relay 736 via back contacts of relay 707 and 734. Relay 736 disables relay 734, prepares a circuit for relay 735, connects ground to conductor 703 to signal the register link, when attached, that the call is a trunk call, connects starting potential through resistances 742 and 743 to conductor 705 similar to those of a calling line and operates relay 712 which reverses the polarity over trunk conductors 710 and 711. This reversal indicates to the operator that the trunk is hunting a register link and register.

The starting potential on conductor 754 operates the starting circuit to complete the circuit for the register link line finder magnets of any free register link line finders and to connect ground to the test relays. When a register link line finder brush 306 encounters test potential on conductor 705, it stops the line finder and reduces the starting potential on conductor 754 and all the link line finders stop. A free register is attached to the register link by the register selector.

Ground from a contact of relay 736, conductor 703, link line finder brush 303 operates relay 335 to prepare the register link circuit for an incoming call. Relay 335 locks to the register link holding ground. Ground via resistance 355, link line finder brush 302, conductor 702 and a contact of relay 736 operates relay 735 which locks to conductor 702. Relay 735 prepares a locking path for itself to a contact of relay 707 and an operating path for relay 728 via front contacts of relays 707 and 735 and back contact of relay 740, prepares the dial impulse circuit, opens the circuit for relay 734, and operates relay 707 from ground on wiper 721 in the normal position of the trunk marker switch, and front contacts of relays 735 and 713.

Relay 707 operates relay 728, locks relay 735, releases relay 736, opens the trunk marker switch restoring path, provides a general holding ground for the trunk circuit and completes the dial impulse path via back contact of relay 708, front contacts of relays 707 and 735, back contacts of relays 726 and 725, magnet 723 of the trunk marker switch to battery. The release of relay 736 releases relay 712 which, in turn, reverses the polarity of the trunk conductors 710 and 711 to indicate to the operator that dialing may begin.

*2.—Reception of the first, second and third digits*

It is assumed that the operator dials for line number 2341. At this time the register link and the register are attached to the trunk, the register link is prepared to operate on an incoming trunk call, and relay 728 of the trunk is operated. When the operator dials the first three digits of number 2341, relay 708 follows the dial pulses and repeats them to the register link by opening the loop to conductors 710 and 711 via repeating coil 716, resistance 717, and contacts of relays 728 and 708. When relay 708 releases on each pulse, ground via the previously described impulse path operates magnet 723 of the trunk marker switch. The marker switch steps with the pulses and relay 714 operates in parallel with magnet 723 on the first pulse and remains operated, due to its slow release characteristics, until the end of the pulses for each digit. Relay 715 operates from relay 714 and removes the ground from brush 720 of the trunk marker switch.

Relays 725 and 726 perform the function similarly performed in the register link circuit of determining whether the called line is within the same hundred's group as the trunk and whether the digit "0" is dialed but distinguishes only between assigned and unassigned hundreds groups. When the trunk marker switch steps to a terminal corresponding to an assigned hundreds group, relay 715 is released by the release of relay 714 at the end of the pulses. Relay 725 operates from ground, a front contact of relay 707, a back contact of relay 715, wiper 720 of the trunk marker switch, back contact and winding of relay 725 to battery. Relay 725 is connected to terminals of wiper 720 corresponding to assigned hundreds numbers and locks to relay 707, opens the dial impulse circuit, opens the path for operating relay 724 from the terminals corresponding to unassigned hundreds numbers and connects ground via wiper 720 to magnet 723 to self-step the marker switch to position 9.

The marker switch is stepped to position 11 on the next two digits by ground from a front contact of relay 707 via front contact of relay 715, back contacts of relays 726 and 724, front contact of relay 725, winding of magnet 723 to battery, since relay 715 operates and releases once for each digit. When relay 715 releases at the end of the last digit and the marker switch steps to position 11, ground via front contact of relay 707, back contact of relay 715 and wiper 720 operates relay 724 to short circuit the impulse contacts of relay 708 and to reclose the impulse path to magnet 723 and thus provide for receiving the impulses for the ringing digit on the trunk marker switch and preventing them from being received by the link marker switch.

The pulses are received by the register link and register circuits to position the link marker switch in the register link, and the hundreds, tens, and units marker switches in the register.

If the trunk marker switch is stepped to a position corresponding to an unassigned hundreds group relay 726 operates via the Y connection to the bank terminals of wiper 720 when relay 715 releases and the trunk circuit is held in this condition until the register link releases.

*3.—Attaching a trunk link*

A free trunk link line finder is attached after the first digit is dialed. The operation of relay 335 connects battery via resistance 813, conductor 361, the register link circuit and link line finder brush 305 to conductor 706. This applies test potential to the corresponding terminals of the line finders of the local links. Ground on conductor 629, line finder offnormal contact 628, back contact of relays 608 and 622, normally closed contacts of jack 620, winding of line finder clutch magnet 607 to battery operates the clutch magnet. All the local line finders, which are of 100 lines capacity and similar to the link line finders, that are idle, are started and hunt for the test potential applied to conductor 706 by brush 305 of the register link line finder. Conductor 706 is connected to the terminals over which the brushes 606 of the local line finders move.

When brush 606 encounters the test potential, relay 608 is operated in a circuit from ground, back contact of relays 626 and 644, left hand winding of relay 608, contact of jack 620, back contact of relay 622 to brush 606. Relay 608 operates and opens the clutch magnet 607 to stop the line finder. The start ground from conductor 629 is then connected through a front contact of relay 608, winding of relay 609, right hand winding of relay 608 to the test circuit. This forms the double test circuit and relay 608 will not hold when two or more are connected to the same test potential. One of them will release before the other and the one that releases first stops the line finder but does not connect through. The one that holds connects through and relay 621 operates and locks to ground on conductor 705 via brush 306 of the link line finder and the register link circuit. The starting circuit is deenergized, ground is disconnected from conductor 629 and test potential via resistance 813 is disconnected from conductor 361.

The operation of relay 622 from a contact of relay 621 transfers line finder brush 606 from relays 608 and 609 to prepare for connecting to selector brush 615 via contacts of relays 636 and 645. While relay 609 is operated it closes a circuit from line finder brush 604 to operate relay 648 if group selection is required. Relay 648 locks to a ground at a contact of relay 622. Relays 608 and 609 release. The release of relay 609 prevents the locking ground for relay 648 from feeding back into the register link. Relay 622 opens the circuit to the line finder clutch magnet 607 to prevent the line finder from moving when test relay 608 releases and provides a holding ground for the link circuit.

*4.—Selection of a called line in same hundreds group*

Selection by the first or hundreds digit is cancelled by the register link. After the tens digit has been recorded, the revertive impulse control circuit is closed from ground in the register, conductor 371, wiper 323 of the register selector, through the register link circuit, brush 303 of the link line finder, conductor 703, trunk line finder brush 603, front contact of relay 621, back contacts of relays 637 and 636, selector offnormal contact 630, winding of relay 618 to battery. Relay 618 operates and extends the ground to clutch magnet 617 via conductor 816 to battery, to maintain the operation of the motor. The operation of the interrupter contacts 630 opens the starting circuit for relay 618 which locks to ground from the register. Selector offnormal contact 631 opens before offnormal contact 632 closes to prevent the operation of relay 634 at this time. The finder brushes rotate to make the selection of the tens group. At this stage of the connection, relay 736 is released and conductor 703 is open in the trunk.

Ground pulses marking the beginning of each tens group are sent to the register via final selector brush 616, back contacts of relays 633, 636 and 637, front contact of relay 621, finder brush 604, conductor 704, link line finder brush 304, through the register link circuit, register selector wiper 324, conductor 372, to the winding of relay 429. Relay 429 operates the stepping magnet of the tens marker switch. The tens marker switch reaches position 11 and fundamental ground is opened from wiper 323 of the register selector for releasing relay 618 and clutch magnet 617 of the trunk link via conductor 703. The register circuit is then prepared for units selection.

The release of relay 618 and clutch magnet 617 stops the selector on the tens group as selected by the tens marker switch. In this illustration, the tens marker switch stepped from position 3 where it was set by the dial pulses, to position 11 where it was driven by the revertive pulses from brush 616 of the selector.

The revertive impulse control circuit is now closed over the previously described circuit from ground, conductor 371, wiper 323 of the register selector, through the register link circuit, brush 303 of the link line finder, conductor 703, brush 603 of the trunk line finder, front contact of relay 621, back contacts of relays 637 and 636, offnormal contact 630 to operate relay 618. Clutch magnet 617 is then operated to rotate the selector brushes. When relay 618 operates, relay 634 operates via selector offnormal contacts 632 and 631. Relay 634 locks to ground from relay 618, prepares an operating path for relay 633 and connects ground to the odd terminals of the group.

As the selector rotates the revertive ground pulses, in this example, from selector brush 616, back contacts of relays 633, 636 and 637, front contact of relay 621, trunk finder brush 604, conductor 704, brush 304 of the link line finder, through the register link circuit, wiper 324 of the register selector, conductor 372, operate relay 429. The final operation of relay 429 from ground on brush 616 of the selector, as determined by the positions of the tens and units marker switches in the register, removes ground from conductor 371 and relay 618 and magnet 617 release, stopping the selector. The register circuit now proceeds to test the called subscriber's line.

5.—*Test of called line*

When relay 618 in the trunk link releases, it opens the locking circuit for relay 634 and removes the short circuit on the winding of relay 633 which operates in series with relay 634 which holds. Selector brush 612 connects cutoff relay 205 via conductor 225, selector brush 612, front contact of relay 633, back contacts of relays 636 and 637, front contact of relay 621, trunk line finder brush 604, conductor 704, link line finder brush 304, through the register link, wiper 324 of the register selector, conductor 372, winding of relay 422 to ground.

If the selected line is free, a test potential on selector brush 612 operates relay 422 and after a slow relay, not shown, operates to allow time for the test, the line free signal is sent to the register link.

If the selected line is busy, there will be no test potential on selector brush 612 and relay 422 does not operate. When the slow relay operates, the line busy signal is sent to the register link.

When the register link circuit receives a line free or busy signal, one of two relays is operated to release the register and register link after signalling the two-trunk circuit and the trunk link.

6.—*Called line tests free*

The two-way trunk controls the connection after the register link is released, rings the called line or sends the busy signal to the operator and provides the transmission circuit for talking. Resistance ground in the register link circuit is connected momentarily to conductor 371, wiper 323 of the register selector, through the register link, brush 303 of the link line finder, conductor 703, trunk line finder brush 603 operates relay 618 but not clutch magnet 617. The momentary operation of relay 618 connects ground via a contact of relay 633 to short circuit relay 634 and hold relay 633. Relay 636 operates while relay 633 is held from a back contact of relay 634, locks to holding ground, connects trunk line finder brush 606 to relays 641 and 642 and transfers the line test connection from contacts of relay 633 to contacts of relay 636 in preparation for the release of relay 633.

Upon receipt of the line free signal the register link connects resistance 344 from battery, brush 305 of the link line finder, conductor 706 and trunk line finder brush 606 to operate relay 642 without operating relay 641. Relay 642, in turn, operates relay 644 which operates relay 619 via back contact of relay 626 and relay 637 and locks to holding ground from relay 622. Relay 619 connects the line circuit from conductors 700 and 701 via trunk line finder brushes 600 and 601 and selector brushes 610 and 611 to line conductors 223 and 224. Relay 637 connects grounded resistance 639 via back contact of relay 643, front contact of relay 636, back contact of relay 647 and selector brush 612 to conductor 224 to hold the called line busy.

In the two-way trunk the ground through high resistance 344, brush 305 of the link line finder and conductor 706 also operates relay 738 which operates relay 740. Relay 740 releases relay 728 and connects pickup ground on conductor 753, front contacts of relays 740, 724 and 726 to operate relay 733 which locks to a contact of ringing trip relay 732. Relay 733 releases relay 724 and connects the ringing leads via conductors 700 and 701 and the trunk link to conductors 223 and 224 of the desired line and ring back tone to the trunk conductors 710 and 711 via repeating coil 716. Ringing current is connected to conductor 701 or 702 by contacts of relay 749.

It is noted that the operation of relay 733 is dependent upon the operation of relay 726 which is not operated until after the dial pulses of the ringing digit have set the trunk marker switch as will be described in section 8.

Relay 728, in releasing, transfers the connections to repeating coil 716 from the bridge resistance 717 to relay 727 to prepare for release supervision.

Ringing current is now sent to the called subscriber's line conductors 223 and 224 from the harmonic ringing conductors 900 via brush 722 of the trunk marker switch, and winding of the ringing trip relay 732.

7.—*Called line tests busy*

If the selected line tests busy, the register link circuit connects low resistance 340 from battery, link line finder brush 305, conductor 706, line finder brush 606 of the trunk link, to operate relays 641 and 642 in the trunk line. Relay 643 operates from relays 641 but relay 644, which is slow to operate, does not operate before relay 641 opens its operating path. Relay 643 holds from ground on line conductor 226 via selector brush 612 and connects ground to conductor 703 via a contact of relay 621 and trunk line finder brush 603.

Relays 737 and 738 also operate in the two-way trunk circuit from battery via resistance 340. Relay 738 closes the operating path for relay 740 from a back contact of relay 737. Relay 740 does not operate before relay 737 operates and relay 739 operates from relay 737 on the busy signal. Relay 739 prepares the operating circuit for relay 741. Ground from relay 643 of the trunk link via a contact of relay 621, trunk line finder brush 603, conductor 703, a back contact of relay 736 and a front contact of relay 739 operates relay 731 which operates relay 729 in turn. Relay 709 operates in parallel with relay 739 and opens the transmission bridge to condenser 719. Relay 712 now operates from the 60 I. P. M. busy tone and flashing ground interrupter connected to conductor 747, front contact of relay 729, back contact of relay 741, front contact of relay 709 and back contact of relay 715 to reverse the polarity of trunk conductors 710 and 711 to indicate to the operator that the desired line is busy. The operator may now release or monitor the line.

If the operator desires to monitor a busy line, she dials "1." This releases relay 708 momentarily and provides a ground pulse via back contacts of relays 708, 707, 735, 724 and 725 to operate relay 741 which locks to holding ground, releases relay 712, and connects the trunk to conductors 700 and 701 via condensers 751 and 752, thus permitting the operator to monitor the call. When the line becomes free, relay 643 in the trunk link releases and removes ground from conductor 703 which releases relay 731 and, in turn, relay 729, which is slow to release. Relay 731 closes a momentary path for operating relay 740 to release relay 709, 739 and 741 in turn. Connection with the called line now proceeds as a call to a free line.

8.—*Reception of fourth digit and ringing*

After the first three digits have been dialed and recorded on the trunk, link, hundreds, tens and units marker switches as described in section B–2, the trunk marker switch has stepped to position 11 and receives the pulses for the fourth digit to select the ringing current. Fully selective harmonic ringing is used as per the following table:

| Party | Frequency | Relays Operated | Line Conductor |
|---|---|---|---|
| 1 | 33 | 726 | 701–224 |
| 2 | 50 | 726 | 701–224 |
| 3 | 66 | 726 | 701–224 |
| 4 | 16 | 726 | 701–224 |
| 5 | 25 | 726 | 701–224 |
| 6 | 33 | 726 and 749 | 700–223 |
| 7 | 50 | 726 and 749 | 700–223 |
| 8 | 66 | 726 and 749 | 700–223 |
| 9 | 16 | 726 and 749 | 700–223 |
| 10 | 25 | 726 and 749 | 700–223 |

At this stage of the connection relays 724 and 726 are not operated. Relay 708 follows the dial pulses and repeats the pulses to the register link to step the link marker switch. Magnet 723 is operated to step the trunk marker switch one step for each pulse in a circuit from ground, back contact of relay 708, front contacts of relays 707 and 735, back contacts of relays 726 and 724, magnet 723 to battery. When the pulses cease, relay 715 connects ground via brush 720 of the trunk marker switch to operate relays 726 and 749 in accordance with the table. In this example, the fourth digit is "1" and the trunk marker switch takes one step to position 12 and relay 726 is operated. As described in section B–6 when the line free signal is received from the register link and relay 740 is operated, relay 733 operates if the trunk marker switch has been set by the dial pulses. If the dial pulses for the ringing digit have not set the link marker switch, relay 733 awaits the operation of relay 726 to send ringing current to the selected subscriber's line as described in section B–6.

9.—*Selection of a called line in a different hundreds group*

The selection of a called line in a different hundreds group requires the selector of the trunk link to operate as a group selector to select a trunk to the selector of a free trunk link, serving the desired line. The terms "group selector" and "final selector" are used in the following description and the number designations for the final selector are primed ('). When the trunk line finder is attached as described in section B–1, relay 648 is operated to transfer the trunk link conductors from group selector brushes 610 and 611 to group selector brushes 614 and 615. Relay 647 operates from relay 648, disconnects group selector brush 612, connects group selector brush 615 to line finder brush 606 and connects group selector brush 615 to the link circuit for testing for a free trunk.

Selection is controlled by the register. Relay 622 has connected conductors 703 and 704 through trunk line finder brushes 603 and 604 to the trunk link circuit. Relay 618 is operated from ground in the register circuit over conductor 703 and, in turn, operates the group selector clutch magnet 617. The group selector rotates to make the selection of the desired trunk group. The clutch magnet 617 and relay 618 lock over offnormal contact 630 to ground in the register via conductor 703. Ground pulses marking the beginning of the trunk groups are sent to the register via group selector brush 616, back contacts of relays 633, 636 and 637, front contact of relay 621, trunk finder brush 604 and conductor 704. When the register receives that number of revertive pulses indicating the group selector is at the trunk group corresponding to the digit dialed, it removes ground from conductor 703 to stop the group selector and releases relay 618 and group selector clutch magnet 617.

The register reoperates relay 618 when it is ready to control the hunting for a free trunk. Relay 618 energizes the group selector clutch magnet 617 and provides an operating path for relay 634 which locks to ground on relay 618, prepares an operating path for relay 633 which, in turn, prepares for the operation of the end of selection relay 636. As the group selector rotates, the register is testing the trunks for a free or busy condition via conductor 706, trunk line finder brush 606, front contact of relay 622, back contacts of relay 636 and 645, front contact of relay 647 and group selector brush 615. Relay 634 remains operated and relay 633 operates in series with it. Relay 636 now operates over front contacts of relays 633, 648 and 634. The register connects resistance ground, momentarily, on conductor 703 to operate relay 618 which, in turn, operates and shunts the winding of relay 634 which releases. Relay 633 locks to relay 618 but releases after relay 618 releases when the ground is removed by the register. Relay 636, which operated with relay 633, locks to ground on relay 622 and connects selector group brush 615 to relay 635.

Ground through the winding of relay 635, group selector brush 615 and conductor 625 operates relay 626′ of the free final selector. Relay 626′ operates relay 622′ which connects conductors 623 and 624 to the final selector circuit in place of the connections from line finder brushes 603′ and 604′ of the selected trunk link in which the associated selector now operates as a final selector.

If all the trunks to the final selector are busy the register sends a busy signal to the register link. Ground is removed from conductor 371 by the register to release relay 618 and clutch magnet 617 and stop the rotation of the group selector. The line busy signal is sent from the register to the register link and battery through resistance 340 of the register link circuit, is connected to brush 305 of the link line finder, conductor 706, front contact of relay 735, windings of relays 737 and 738 in the trunk circuit and ground. The resistance 340 is of such value that relays 737 and 738 both operate. Relay 740 is prevented from operating, because of its slow operating characteristic, and relays 739 and 709 operate from ground at a front contact of relay 737. The operation of relay 709 connects the 120 I. P. M. flashing interrupter via conductor 746, back contacts of relay 729 and 741, a front contact of relay 709, a back contact of relay 715, winding of relay 712 to battery. Relay 712 reverses the current to trunk conductors 710 and 711 at a rate of 120 reversals per minute to signal the operator that the trunks are busy and that the connection should be immediately released by opening the trunk conductors and releasing relay 708.

Whenever a flashing signal from the interrupters 60 or 120 I. P. M. over conductors 746 and 747, depending upon the released or operated condition of relay 729, is used as a flashing signal through the operation of relay 712, as previously described, over trunk conductors 710 and 711, an interrupter busy tone at the same rate over conductors 744 and 745, similarly depending upon the released or operated condition of relay 729, is connected through a back contact of relay 741, condenser 752, a front contact of relay 739 to the repeating coil 716 to give the operator an audible signal that either all the trunks are busy or that the called line is busy.

The selection of the desired line is made as described in section B–4 the fundamental circuit being connected to the register via conductor 623 and 624, brushes 613 and 614, back contacts of relay 645, front contacts of relay 648 and front contacts of relays 619, 637 and 621 of the preceding group selector, associated trunk line finder brushes 603 and 604 and conductors 703 and 704.

The test of the selected line is made by the register and the final selector as described in section B–5. The free line signal is passed through the group selector when relay 642 operates and, in turn, operates relay 644. The operation of relay 644 connects battery via resistance 640, a back contact of relay 619, resistance 642, front contact of relay 644, back contact of relay 645, group selector brush 613, conductor 623 to windings of relays 641′ and 642′ of the final selector to ground. Relay 642′ operates as described in section B–5. Relay 619 is operated in the group selector to transfer the group selector brushes 613 and 614 from finder brushes 603 and 604 to finder brushes 600 and 601. The register link releases but relays 621 and 622 are held operated by the two-way trunk via finder brush 605, conductor 705, back contact of relay 736, front contacts of relays 740 and 707 to ground.

When a busy signal is received from the register link relays 641 and 642 both operate. Relay 641 repeats the low resistance battery by connecting resistance 640 via group selector brush 613 and conductor 623 to relays 641′ and 642′ of the final selector. Relay 643 operates and connects ground via a contact of relay 621, trunk line finder brush 603 and conductor 703 to operate relay 731 of the two-way trunk circuit as described in section B–5. Relay 619 operates to connect the line wires through the group selector to the final selector and the circuit awaits the freeing of the busy line or release by the two-way trunk circuit.

10.—*Talking, supervision and release*

At the end of section B–6 it is noted that ringing current is connected to the line conductors through a winding of the ringing trip relay 732 when relay 733 is operated. When the called subscriber answers the ringing trip relay 732 is operated and relay 733 releases. The called subscriber's line connected through the trunk link to conductors 700 and 701 is extended through back contacts of relays 733 and 739 to the repeating coil 716 and talking battery is supplied through the windings of relay 727 which operates. Relay 727 operates relay 712 to reverse the current to trunk conductors 710 and 711 to signal the operator that the call has been answered. Supervision to the operator is obtained by the release and operation of relay 712 under control of relay 727 which, in turn, is controlled by the called subscriber. If the operator should wish to recall a subscriber who has hung up she will dial "1" which releases relay 708 and connects ground via back contact of relay 708, front contacts of relays 707, 735, 726 and 725, back contacts of relays 741 and 739 to operate relay 724. The pickup interrupter is now connected over conductor 753 through front contacts of relays 740, 724 and 726 to operate relay 723. Ringing is now applied to the calling subscriber's line as previously described.

When the subscriber disconnects first, relay 727 releases and, in turn, releases relay 712 which reverses the polarity of trunk conductors 710 and 711 indicating to the operator that the call is completed. The trunk waits for the disconnect by the operator which will release relay 708 and, in turn, relay 713 and 707. Relay 707 removes holding ground from conductor 705 and the remaining relays which now release and free the trunk circuit. The trunk marker switch returns to normal via its own interrupter contact, brush 721 and a contact of relay 707. When holding ground is removed from conductor 705, relays 621 and 622 release. Relay 622 removes the holding ground for the trunk link circuit which releases. The group selector returns to its normal position, clutch magnet 617 being energized from ground on offnormal contact 632 via back contacts of relays 648 and 622. The final selector is released from the group selector by removing the grounded winding of relay 635 from conductor 625 to release relay 626' of the final selector circuit. The release of relay 626' releases relay 622' which opens holding ground and closes the circuit for restoring the final selector to normal.

When the operator disconnects, first relay 708 releases and releases relays 713 and 707 which, in turn, removes holding ground for the remaining relays with the exception of relay 727 and 712. Relay 727 releases when the trunk link opens the circuit to the subscriber's line and releases relay 712. The release of relay 205 of the line circuit connects the line and lockout relays, not shown, to the line to hold the line circuit in the lockout condition until the subscriber hangs up.

While we have described above the principles of our invention in connection with specific apparatus, it is to be clearly understood that this description is made only by way of example and not as a limitation to the scope of our invention.

What is claimed is:

1. In an automatic telephone system a central office, a community office including subscribers' lines divided into groups, each group designated by the first digit of the line number, groups of register links corresponding to said groups of lines, each link comprising a line finder having certain of its contacts connected to the lines of the corresponding group and a register selector, registers connected to the contacts of said register selectors for controlling the selection of a called line, a two-way trunk circuit in the community office including a rotary switch for completing the connections between the subscribers' lines and the central office, calling dials at the central office for controlling the sending of digit pulses representing numbers, means in the two-way trunk circuit responsive to dial pulses from the central office for operating the rotary switch of the trunk circuit and for repeating the dial pulses to a selected one of said registers, means in the trunk circuit controlled by the rotary switch for distinguishing between first digit numbers representing assigned and unassigned groups of lines, and further means in said trunk circuit responsive to the position of the rotary switch for holding said trunk circuit when said rotary switch is in a position representing an unassigned group of lines.

2. The system according to claim 1, and, in addition, means for releasing the register link responsive to the pulses of the first digit dialed for an unassigned group of lines and means controlled by said releasing means for releasing said trunk circuit.

3. In an automatic telephone system, a central office, a community office including a subscriber's line, an incoming trunk circuit in the community office connected to the central office, a calling dial for sending digit pulses at the central office connected to said trunk circuit for selecting the subscriber's line over said trunk circuit, a register link comprising a line finder having contacts connected to said trunk circuit and a register selector, a register for controlling the establishment of a connection between the central office and said subscriber line, said register being connected to said register selector of said register link so that it can be selected thereby, a trunk link comprising a line finder having contacts multipled to the contacts of said register link line finder and a selector having contacts connected to said lines, a rotary switch in said trunk circuit responsive to the pulses of the first digit dialed by said calling dial, and means in said trunk circuit determined by the position of said rotary switch in accordance with the first digit dialed to distinguish between an assigned and an unassigned line group.

4. In an automatic telephone system, a two-way trunk circuit including a rotary switch connected to a central office, a subscriber's line having a three digit call number, a register, a register link comprising a line finder having contacts connected to said two-way trunk circuit and a register selector having contacts connected to said register for connecting said two-way trunk circuit to said register, a calling dial connected to said trunk circuit at the central office for controlling the sending of digit pulses representing numbers, means in said trunk circuit for operating said rotary switch under control of the dial pulses and for repeating the pulses to said register link and to said register, said means including means for stepping said rotary switch one step for each impulse of the first digit, means for thereafter stepping said switch to a predetermined position, and means for thereafter stepping said switch one step each for the second and third digits and means for utilizing subsequent movement of said switch for transmitting ringing current to said subscriber's line.

5. In an automatic telephone system, a multiparty subscriber's line, an incoming trunk circuit including a rotary step-by-step switch, a calling dial connected to the distant end of said incoming trunk circuit for controlling the sending of digit pulses representing numbers, a register for establishing connections from said incoming trunk circuit to a party on said subscriber's line, a register link including a line finder having contacts connected to said incoming trunk circuit and a register selector having contacts connected to said register for connecting said register to said incoming trunk circuit, a trunk link including a line finder having contacts connected to said incoming trunk circuit and a selector having contacts connected to said subscriber's line for connecting to said subscriber's line, switch means in said incoming trunk circuit, means controlled by said switch means for causing said register link to connect said register to said incoming trunk circuit, means including said rotary switch for operating said switch means in accordance with the pulses of a predetermined number of digits and for repeating said pulses to the register link and said register, means in said incoming trunk circuit for blocking the transmission of pulses of succeeding digits of the call number to said register link and said register, and means controlled by said last-mentioned means for operating said rotary switch in accordance with the pulses of succeeding digits.

6. In an automatic telephone system, a multiparty subscriber's line having a four digit line number, the first three digits of the line number designating the line terminal and the fourth digit designating a party on the multi-party line, an incoming trunk circuit including a rotary step-by-step switch, a calling dial connected to the distant end of said trunk circuit for controlling the sending of digit pulses representing numbers, a register for establishing connections from said incoming trunk circuit to said subscriber's line, a register link including a line finder having contacts connected to said incoming trunk circuit and a register selector having contacts connected to said register for connecting said register to said trunk circuit, a trunk link including a line finder having contacts connected to said incoming trunk circuit and a selector having contacts connected to said line for connecting said trunk circuit to said subscriber's line, means in said incoming trunk circuit for stepping said rotary switch one step for each pulse of the first digit received from said calling dial and one step each for the next two digits, means controlled by said rotary switch for repeating the pulses of the first three digits to said register link and said register, means controlled by said register in response to the pulses received thereby for operating the selector in said trunk link to connect said trunk circuit with said line, means in said incoming trunk circuit for further stepping the rotary switch in accordance with the pulses of the fourth digit received from said calling dial, means controlled by said rotary switch for blocking the repetition of the pulses of the fourth digit to said register link and said register, and means in said incoming trunk circuit depending upon the position of the rotary switch for applying ringing current to signal a desired called party on said subscriber's line.

7. In an automatic telephone system, a multiparty subscriber's line, an incoming trunk circuit including a rotary step-by-step switch, a register for establishing connections from said incoming trunk circuit to said subscriber's line, a register link including a line finder having contacts connected to said incoming trunk circuit and a register selector having contacts connected to said register for connecting said register to said incoming trunk circuit, a trunk link including a line finder having contacts connected to said incoming trunk circuit and a selector having contacts connected to said line for connecting said incoming trunk circuit to said subscriber's line, means in said incoming trunk circuit for operating said register link line finder to connect said register to said incoming trunk circuit, means in said incoming trunk circuit responsive to the dialling of a predetermined number of digits for setting said register in accordance therewith, means controlled by the setting of said register for operating the trunk link selector to connect said trunk circuit to said subscriber's line, and means in said trunk circuit responsive to the dialling of a digit suffix for selectively operating said rotary switch to apply ringing current to signal a desired called party on said subscriber's line.

8. In an automatic telephone system, a plurality of subscribers' lines, an incoming trunk, registers for establishing connections from said incoming trunk to a called one of said subscribers' lines, register links including line finders having contacts connected to said incoming trunk and register-selectors having contacts connected to said registers for connecting one of said registers to said incoming trunk, trunk links including line finders having contacts connected to said incoming trunk and selectors having contacts connected to said lines for connecting said incoming trunk to a called one of said subscriber's lines, means in said registers responsive to the completion of connections to a called one of said subscriber's lines for determining the busy or idle condition of said line, and means in said incoming trunk responsive to said last mentioned means in said register to transmit a busy signal over said incoming trunk.

9. In an automatic telephone system, a subscriber's line, an incoming trunk, a calling dial connected to the distant end of said incoming trunk for controlling the sending of digit pulses representing numbers, a register for establishing connections from said incoming trunk to said subscriber's line, a register link including a line finder having contacts connected to said incoming trunk and a register-selector having contacts connected to said register for connecting said register to said incoming trunk, a trunk link including a line finder having contacts connected to said incoming trunk and a selector having contacts connected to said line for connecting said incoming trunk to said subscriber's line, means in said incoming trunk for transmitting a flashing busy signal to the distant end of said incoming trunk, means in said register responsive to the completion of a connection to a called line for testing the busy or idle condition of said called line and for transmitting a line free or line busy signal to said incoming trunk, and means in said incoming trunk responsive to the receipt of a line busy signal for transmitting the flashing busy signal to the distant end of said incoming trunk.

10. The system according to claim 9, and in which said incoming trunk includes a rotary switch responsive to the digit pulses from the calling dial whereby it is selectively operated for applying ringing current to a called subscriber's line, and means in said incoming trunk upon receipt of a line free signal for applying ringing current in accordance with said position of the rotary switch to said called subscriber's line.

11. The system according to claim 9, and in which said subscriber's line is a multi-party line.

12. The system according to claim 9, and in which said subscriber's line, register links, and said trunk links are divided into groups according to the first digit of the called number, the trunk link selector having certain other of its contacts connected to other trunk links and when a call is made for a line in a group to which said incoming trunk is not connected, the selector of the associated trunk link operates as a group selector to select a trunk link of the desired group and operates the selector thereof as a final selector all under the control of said register, and means in said incoming trunk responsive to the receipt of the busy signal indicating that all the incoming trunks to the final selectors are busy, for transmitting a flashing signal to the distant end of said incoming trunk.

13. The system according to claim 9, and in which the means in said incoming trunk for receiving the line free or line busy signal comprises two relays, one of which is operated to transmit a busy signal, and the other of which is operated to indicate line free.

HOWARD G. DUHAMEL.
EDWARD O. CAMPBELL.
RAYMOND A. REED.

REFERENCES CITED

The following references are of record in the file of this patent:

UNITED STATES PATENTS

| Number | Name | Date |
|---|---|---|
| 1,450,321 | Lundell | Apr. 3, 1923 |
| 1,482,618 | Polinkowsky | Feb. 5, 1924 |
| 1,575,140 | Williams | Mar. 2, 1926 |
| 2,108,140 | Patterson | Feb. 15, 1938 |
| 2,250,101 | Hubbard | July 22, 1941 |
| 2,339,709 | Ostline | Jan. 18, 1944 |
| 2,447,494 | Deakin | Aug. 24, 1948 |